(12) United States Patent
Zhang et al.

(10) Patent No.: US 8,971,665 B2
(45) Date of Patent: Mar. 3, 2015

(54) HIERARCHICAL CLUSTER DETERMINATION BASED ON SUBGRAPH DENSITY

(75) Inventors: Bin Zhang, Fremont, CA (US); Meichun Hsu, Los Altos Hills, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 206 days.

(21) Appl. No.: 13/562,598

(22) Filed: Jul. 31, 2012

(65) Prior Publication Data

US 2014/0037227 A1 Feb. 6, 2014

(51) Int. Cl.
*G06K 9/36* (2006.01)
*G06F 7/00* (2006.01)

(52) U.S. Cl.
USPC .......................................... 382/286; 707/737

(58) Field of Classification Search
USPC .................. 382/113, 173, 225, 286; 707/737; 726/22
See application file for complete search history.

(56) References Cited

U.S. PATENT DOCUMENTS

| | | | |
|---|---|---|---|
| 6,021,383 A * | 2/2000 | Domany et al. .............. | 702/181 |
| 6,154,220 A | 11/2000 | Prakriya et al. | |
| 6,226,408 B1 * | 5/2001 | Sirosh ........................... | 382/224 |
| 7,406,200 B1 | 7/2008 | Syeda-Mahmood et al. | |
| 7,523,117 B2 | 4/2009 | Zhang et al. | |
| 7,668,957 B2 | 2/2010 | Achlioptas et al. | |
| 7,808,921 B2 * | 10/2010 | Zhang et al. .................. | 370/252 |
| 7,933,915 B2 * | 4/2011 | Singh et al. ................... | 707/760 |
| 8,243,988 B1 * | 8/2012 | Buddemeier ................. | 382/103 |
| 8,463,786 B2 * | 6/2013 | Udupa et al. .................. | 707/737 |
| 8,521,782 B2 * | 8/2013 | Gong et al. ................... | 707/791 |
| 8,561,184 B1 * | 10/2013 | Marsa et al. ................... | 726/22 |

OTHER PUBLICATIONS

M. Delest et al., "Assessing the quality of multilevel graph clustering," http://hal.archives-ouvertes.fr/hal-00579474/, dated Mar. 24, 2011.

K.J. Lang et al., "Finding dense and isolated submarkets in a sponsored search spending graph," Procs. of CIKM'07, Nov. 6-8, 2007, ACM, Lisboa, Portugal.

* cited by examiner

*Primary Examiner* — Kanjibhai Patel
(74) *Attorney, Agent, or Firm* — Michael A Dryja (57) ABSTRACT

Densest subgraphs of a graph are determined. The graph includes vertices and edges interconnecting the vertices. Each edge connects two of the vertices and has a weight. The vertices and the edges form subgraphs from which the densest subgraphs are determined as those subgraphs having densities greater than a threshold. Clusters at levels of a hierarchy are determined based on the densest subgraphs. Each cluster includes a set of the vertices and a set of the edges of the graph. Each level corresponds to a different density of the clusters. The hierarchy is ordered from a most-dense level of the clusters to a least-dense level of the clusters.

20 Claims, 4 Drawing Sheets

HIERARCHICAL CLUSTER DETERMINATION BASED ON SUBGRAPH DENSITY

BACKGROUND

Naturally occurring and artificially constructed networks are found everywhere in the real world. The Internet's worldwide web (WWW) is itself a network, as are social networks formed by individuals interconnecting with one another on social-networking web sites. Business clubs, research, gaming, and other communities are also networks. Telephone records can constitute a network, where the individuals that call other individuals can be viewed as a network of these phone users.

DETAILED DESCRIPTION

As noted in the background section, naturally occurring and artificially constructed networks are abundant in the real world. A network can be modeled as a graph that has vertices, or nodes, interconnected by edges. For a social network, for instance, a corresponding graph includes vertices representing the individuals of the network, and edges representing some sort of social connection among these individuals. As one example, an edge between two vertices representing corresponding individuals may indicate that the individuals have become friends with one another within the social network.

An edge can implicitly or explicitly have a weight that denotes the level of connectedness between the two vertices that the edge connects together. For a graph in which the edges are equally weighted, the weights of the edges are implicitly equal to a normalized value of one. For a graph in which the edges are unequally weighted, the weight of each edge has a normalized value greater than zero. In the case of a social network, for instance, the edges may be equally weighted, such that there may be no difference in degree of friendship between an individual and a first friend and between this same individual and another friend.

Techniques disclosed herein are operative on such graphs representative of networks. The techniques provide for a manner by which the vertices of a graph can be clustered based on densest subgraphs of the graph. A subgraph of a graph is a portion of the vertices and the edges that interconnect these vertices of the graph as a whole. The density of a subgraph or a cluster is defined as the sum of the weights of the edges encompassed by the subgraph or cluster in question, divided by the number of vertices also encompassed thereby (that is, the vertices interconnecting the encompassed vertices). Where the edges of a graph are equally weighted, the density is simply the number of edges divided by the number of vertices.

Clusters can be hierarchical in correspondence with subgraph density, and permit a wide range of analytical techniques to be employed on the resulting identified clusters. For example, in the case of a social network, clustering can be used to identify closely knit groups of friends. The individuals in a cluster of higher density are more interconnected with one another than the individuals in a cluster of lower density. One cluster can hierarchically subsume another cluster, such that the individuals in a more dense cluster are also part of a less dense cluster, but the individuals in the less dense cluster are not all part of the more dense cluster.

Figure 1A:
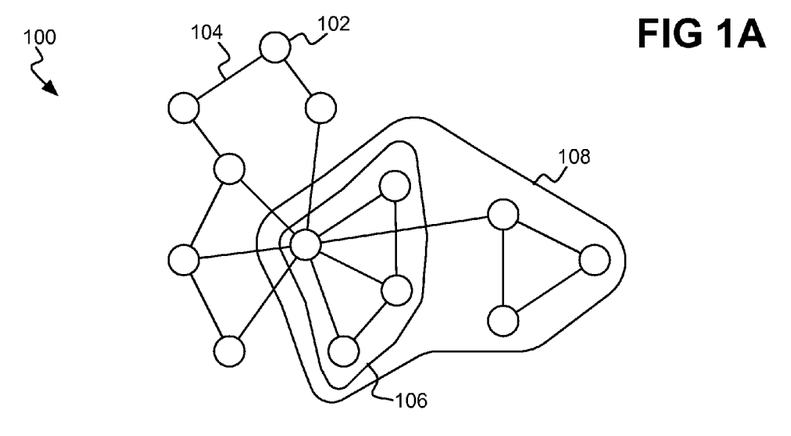
FIGS. 1A and 1B are diagrams of an example graph having subgraphs and example nested clusters.

FIG. 1A shows an example graph 100. The graph 100 can represent a network naturally occurring or artificially constructed within the real world. The graph 100 includes vertices 102, which may also be referred to as nodes. The vertices 102 are interconnected with one another via edges 104. Each edge 104 interconnects two vertices 102. There are thirteen vertices 102 and seventeen edges 104 depicted in FIG. 1A for example purposes, but real world networks can have corresponding graphs in which the numbers of such vertices 102 and edges 104 are much higher, numbering in the hundreds, thousands, millions, or more.

The edges 104 can be equally or unequally weighted. Where the edges 104 are equally weighted, each edge 104 at least implicitly has a normalized weight of one. Where the edges 104 are unequally weighted, each edge 104 has a normalized weight greater than zero and less than or equal to one.

A subgraph of the graph 100 includes a portion of the vertices 102, and the edges 104 that interconnect these vertices 102. Two example subgraphs are depicted in FIG. 1A: a subgraph 106 nested within a larger subgraph 108. The subgraph 106 encompasses four vertices 102 and five edges 104 that interconnect these three vertices 102. The subgraph 108 encompasses seven vertices 102 and eight edges 104.

Where the edges 104 of the graph 100 are equally weighted, the density of the subgraph 106 is equal to the number of its edges 104 divided by the number of its vertices 102, or five divided by four, which is 1.25. Similarly, where the edges 104 are equally weighted, the density of the subgraph 108 is equal to the number of its edges 104 divided by the number of its vertices 102, or eight divided by seven, which is approximately 1.14. The subgraph 106 is thus a more dense subgraph nested within the less dense subgraph 108.

Figure 1B:
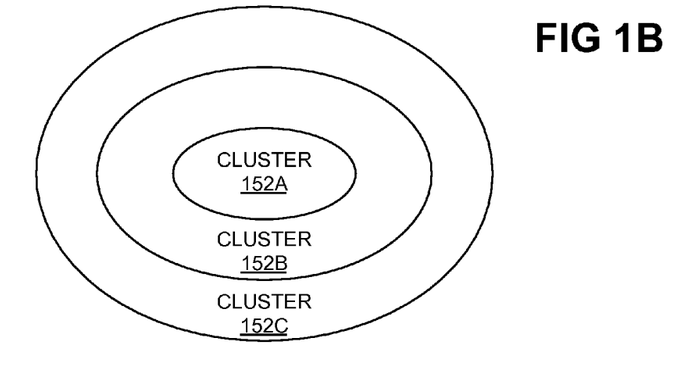

FIG. 1B illustratively depicts example hierarchically nested clusters 152A, 152B, and 152C, which are collectively referred to as the clusters 152. The cluster 152A is nested within the cluster 152B, which in turn is nested within the cluster 152C. The cluster 152A is most dense, whereas the cluster 152C is least dense and the cluster 152B has a density between that of the clusters 152A and 152C. There are three hierarchical levels of clusters 152 in the example of FIG. 1B, with the cluster 152A at the first level, the cluster 152B at the second level, and the cluster 152C at the third level.

Techniques disclosed herein permit for the vertices of a graph, such as the vertices 102 of the graph 100, to be clustered among k such clusters 152, where k corresponds to the number of levels within the hierarchy of the clusters 152. As k increases, the overall density of the cluster at the level k decreases, but the number of vertices that the cluster encompasses increases. Therefore, a higher k cluster specifies more vertices, albeit at less connectedness (i.e., at less density), than a lower k cluster does.

Figure 2:
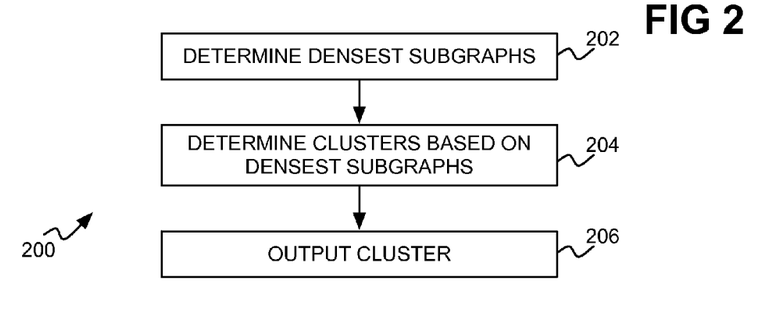
FIG. 2 is a flowchart of an example method for clustering vertices of a graph into hierarchical clusters.

FIG. 2 shows an example method 200 for clustering the vertices and edges of a graph. As noted above, a graph includes vertices and edges interconnecting the vertices. Each edge interconnects two vertices, and implicitly or explicitly has a weight. The vertices and the edges form arbitrarily defined subgraphs that each include a subset of the graph's vertices and the edges that interconnect these vertices. A processor of a computing device can perform the method 200, as is described in more detail later in the detailed description.

The method 200 includes determining the densest subgraphs of a graph (202). The densest subgraphs of the graph are those subgraphs of the graph that have densities greater than a threshold. As noted above, the density of a subgraph is defined as the sum of the weights of the edges of the subgraph divided by the number of vertices of the subgraph. Where the subgraph has equally weighted edges, its density is thus the number of edges divided by the number of vertices. Any desired threshold can dictate which are considered the most dense subgraphs.

The method 200 further includes determining clusters based on these densest subgraphs that have been determined (204). Each cluster includes a set of vertices of the graph and a set of edges that interconnect these vertices within the graph. The clusters are ordered over levels of a hierarchy from a most-dense level to a least-dense level. The cluster at the level k is more dense than the cluster at the level k+1, for any value k. Furthermore, the cluster at the level k is nested within the cluster at the level k+1. Each level of the hierarchy thus corresponds to a different density of the clusters.

The method 200 also includes outputting the clusters at the levels of the hierarchy that have been determined (206). For instance, the identities of the constituent vertices and/or edges of each cluster can be provided to a computer program for analysis thereof. Such clusters can be visually displayed on a display device for viewing by a user, in a static or dynamic manner. As an example of the latter, a user may be able to employ a slider or other graphical user interface (GUI) element to control the current level k and thus which cluster and its constituent vertices and/or edges are displayed. Other output techniques can also be performed within part 206 of the method 200.

Particular implementations of parts 202 and 204 are now described. Such implementations are described in mathematically oriented terms. In an undirected graph G=(V,E), V is a set of the vertices of the graph, and E is a set of the edges of the graph. Each edge e=(u,v) is incident to two vertices u and v in V. Each edge can be assigned a weight $w_e > 0$, where the weight for each edge in a graph having equally weighted edges is equal to one.

Given a subset of vertices $V_s \subset V$, a subgraph $G_s=(V_s,E_s)$ is the subgraph that contains the edges $e \in E$ that connect two vertices in $V_s$, or $$E_s = \{e=(u,v) \in E | u,v \in V_s\}. \tag{1}$$

The subgraph $G_s=(V_s,E_s)$ is a k-subgraph where $k=|V_s|$. A densest k subgraph is a k-subgraph having a highest total weight on its edges among all k-subgraphs.

Figure 3:
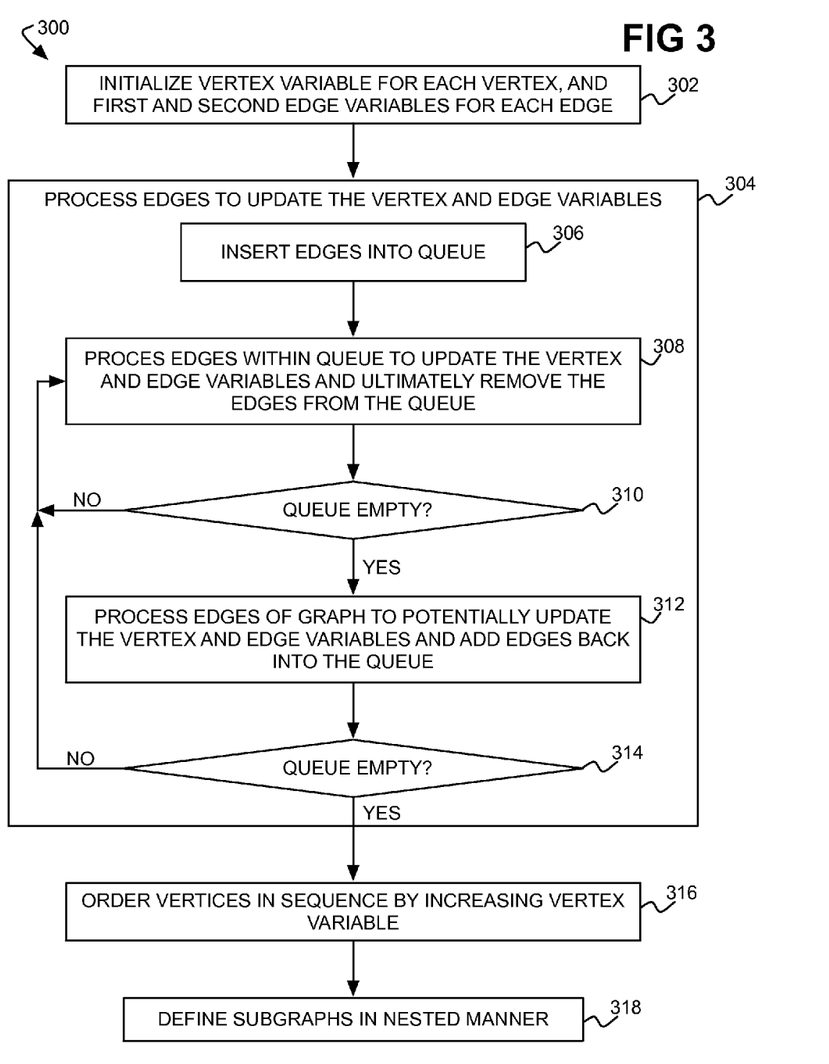
FIG. 3 is a flowchart of an example method for determining the densest subgraphs of a graph, and which can be performed as part of the example method of FIG. 2.

FIG. 3 shows an example method 300 for determining the densest subgraphs of a graph, and which can implement part 202 of the method 200. A vertex variable is initialized for each vertex of the graph, and a first edge variable and a second edge variable are initialized for each edge (302). For a given edge, the first edge variable is for a first vertex to which the given edge is connected, and the second edge variable is for a second vertex to which the given edge is connected.

Mathematically, for each vertex $u \in V$, there is a vertex variable $\lambda_u$. For each edge e that connects two vertices u and v, there are first and second edge variables $f_{e,u}$ and $f_{e,v}$, respectively. Initialization of the variables can be performed in part 302 in a variety of different ways. In one implementation, the variables are initialized as follows:

$$f_{e,u} = \frac{w_e}{2} \text{ and } \lambda_u = \sum_{e \text{ incident to } u} f_{e,u}. \tag{2}$$

In these equations, $w_e$ is the weight assigned to the edge e.

The edges of the graph are processed to update the vertex variables for the vertices and the first and second edge variables for the edges (304). In one implementation, such processing includes the following. The edges of the graph are inserted into a round-robin queue Q (306). The edges do not have to be inserted into the queue in any particular order.

The edges within the queue are then processed to update the vertex and the edge variables and ultimately to remove the edges from the queue (308). For each given edge e=(u,v) within the queue, the following is performed. If $\lambda_u > \lambda_v$ and $f_{e,u} > 0$, which is generally referred to as a first condition, then the vertex variables for the vertices U and V in question and the edge variables $f_{e,u}$ and $f_{e,v}$ are updated in accordance with a first manner. This first manner is in one implementation as follows. A modifier is determined as:

$$\delta = \min\left\{\frac{\lambda_u - \lambda_v}{2}, f_{e,u}\right\}. \tag{3}$$

The vertex variables and the edge variables are then updated as follows:

$$\lambda_u = \lambda_u - \delta, \lambda_v = \lambda_v + \delta, f_{e,u} = f_{e,u} - \delta, f_{e,v} = f_{e,v} + \delta. \tag{4}$$

Note that the edge is not removed from the queue, but is moved to the back of the queue.

If instead $\lambda_v > \lambda_u$ and $f_{e,v} > 0$, which is generally referred to as a second condition, then the vertex variables for the vertices u and v in question and the edge variables $f_{e,u}$ and $f_{e,v}$ are updated in accordance with a second manner different than the first manner. This second manner is in one implementation as follows. The modifier is instead determined as:

$$\delta = \min\left\{\frac{\lambda_v - \lambda_u}{2}, f_{e,v}\right\}. \tag{5}$$

The vertex variables and the edge variables are then updated as follows:

$$\lambda_v = \lambda_v - \delta, \lambda_u = \lambda_u + \delta, f_{e,v} = f_{e,v} - \delta, f_{e,u} = f_{e,u} + \delta. \tag{6}$$

Note that the edge is not removed from the queue, but is moved to the back of the queue.

Finally, if neither the first condition nor the second condition is true, then the given edge is removed from the queue. If, at the end of the processing of each edge within the queue once as has been described, the queue is still not empty (310), then the method 300 reprocesses the edges remaining within the queue as has been described (308). Otherwise, where the queue is now empty (310), the method 300 processes each edge within the graph again (312), to potentially update the vertex edges of the vertices and the first and second edge variables of the edges and add the edges back into the queue. This processing can be performed in a similar manner as has been described above in relation to part 308.

Specifically, in part 312, if the first condition is true for a given edge, the variables are updated in accordance with the first manner, and the given edge is added back into the queue. By comparison, if the second condition is true for a given edge, the variables are updated in accordance with the second manner, and the given edge is also added back into the queue. Furthermore, if neither condition is true for a given edge, then the given edge is not added back into the queue. If the queue is then no longer empty (314), then the method 300 reprocesses the edges that are now within the queue as has been described (308).

If the queue is still empty (314), however, then the method 300 orders the vertices of the graph in a sequence by increasing vertex variable (316). That is, the sequence $\{(u,\lambda_u)|u \in V\}$ is output in the increasing order of $\lambda_u$. The sequence is thus:

$$\lambda_{u_1} \geq \lambda_{u_2} \geq \lambda_{u_3} \ldots \lambda_{u_{|V|-1}} \geq \lambda_{u_{|V|}}. \quad (7)$$

In this sequence, whenever there is a strict increase in the value of $\lambda_u$, then the k-subgraph having vertices $V_s = \{u_1, u_2, \ldots, u_k\}$ is the densest k-subgraph.

The subgraphs of the graph are defined in a nested manner (318). A k-subgraph includes the first k vertices in the sequence. A subgraph having a lesser k than another subgraph has is more dense but includes fewer vertices than the latter subgraph. As such, the densest subgraphs that have been determined form a nested chain, in which the larger subgraphs contain the smaller subgraphs.

The different $\lambda_u$'s can be referred to sequentially as:

$$\lambda_1 > \lambda_2 > \ldots > \lambda_L. \quad (8)$$

In this nomenclature, L is the number of the densest subgraph. As such, $$D_l = (V_l, E_l), l = 1, \ldots, L \quad (9)$$

represents the corresponding densest subgraphs, in which $$V_l = \{u \in V | \lambda_u \geq \lambda_l\} \quad (10)$$

and $$E_l = \{e = (u,v) \in E | u \in V_l \& v \in V_l\}. \quad (11)$$

The nested property is:

$$V \supset V_L \supset V_{L-1} \supset \ldots \supset V_1 \quad (12)$$

and $$E \supset E_L \supset E_{L-1} \supset \ldots \supset E_1. \quad (13)$$

Furthermore, $\lambda_l$ is the density ranking of $D_l = (V_l, E_l)$, $l = 1, \ldots, K$.

Figure 4:
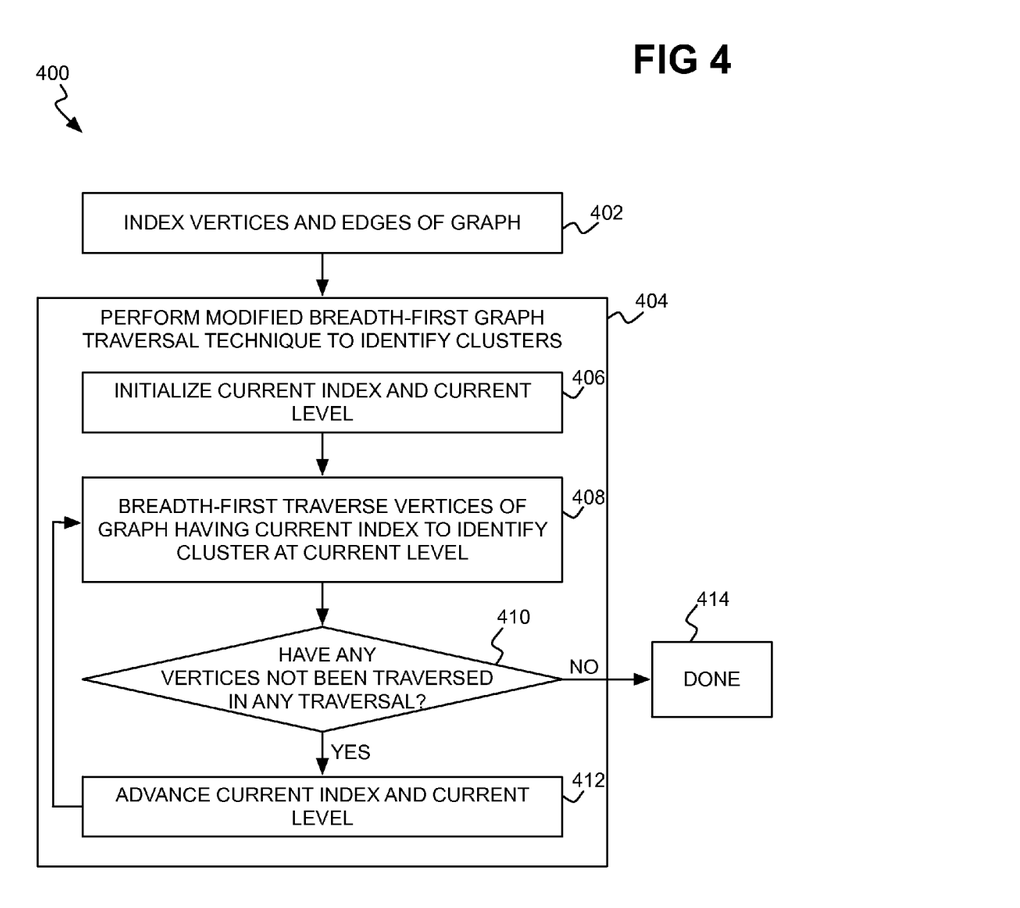
FIG. 4 is a flowchart of an example method for determining clusters from the densest subgraphs of a graph, and which can also be performed as part of the example method of FIG. 2.

FIG. 4 shows an example method 400 for determining clusters from the densest subgraphs of a graph, and which can implement part 204 of the method 200. The vertices and edges of the graph are indexed (402), according to the densities of the subgraphs, as an initialization of the method 400. Specifically, the vertices of the graph are indexed according to the density rankings thereof, or:

$$V_l = \{u_1, \ldots, u_{k_l}\}, \text{ for } l=1, \ldots, L \quad (14)$$

and $$k_l < k_{l+1}, l=1, \ldots L \text{ and } k_L = |V|. \quad (15)$$

Similarly, the edges of the graph are indexed according to the density rankings thereof, or:

$$E_l = \{e_1, \ldots, e_{j_l}\}, l=1, \ldots, L \quad (16)$$

and $$j_l < j_{l+1}, l=1, \ldots, L \text{ and } j_L = |E|. \quad (17)$$

It can further be assumed that the edge list at each vertex is arranged according to the increasing order of the edge's global indexing in one implementation.

A modified breadth-first graph traversal technique is performed to identify the clusters at the levels of the hierarchy, using the vertices and the edges as have been indexed according to the densities of the subgraphs (404). A breadth-first graph traversal technique is a type of breadth-first search for searching or traversing a graph in which the neighbors of a particular vertex, or node, are examined prior to traversing the graph along a given branch thereof to inspect the vertex's children. In this respect, a breadth-first graph traversal technique is different than a depth-first traversal technique that searches or traverses a graph along each branch thereof before backtracking to a vertex's neighbors.

The breadth-first graph traversal technique in question is a modified such technique in one implementation as follows. First, when a current or given traversal ends as a result of exhausting the edges of the graph that are permitted to be traversed within the current traversal in question, the next traversal begins at the vertex of the graph having the smallest index and that has not yet been traversed. Second, no traversal of the graph traverses between two vertices thereof that have different indices. That is, traversal is permitted just at the same density level.

In one implementation in particular, the modified breadth-first graph traversal technique is performed as follows. A current index and a current level are initialized (406). The current index is with respect to the vertices, whereas the current level is with respect to the hierarchy of levels at which the clusters are ultimately determined or identified. The current index is set to a lowest index of the vertices of the graph. The current level is set to a lowest level of the hierarchy.

The vertices of the graph that have the current index are then breadth-first traversed to identify the cluster at the current level (408). That is, the breadth-first traversal starts at one of the vertices of the graph having the current index, and does not ever traverse any vertex that has an index different than the current vertex index. The traversal continues in this way until no further vertices of the graph having the current index can be traversed. The vertices of the graph having the current index that have been traversed, and the edges interconnecting these vertices, thus form the cluster at the current level of the hierarchy.

If there exist any vertices of the graph that have not yet been traversed in any traversal (410), then the method 400 advances the current index and the current level (412). Specifically, the current index is set to the lowest index of the vertices of the graph that have not yet been traversed in any traversal thereof. The current level is advanced to the next highest level of the hierarchy, such as by being incremented by one. The method 400 is then repeated by again breadth-first traversing the vertices of the graph, albeit at the (new) current index and to identify the cluster at the (new) current hierarchical level (408).

When there are no remaining vertices of the graph that have yet to be traversed (410), the method 400 is finished (414). The result is a collection of clusters at the levels of the hierarchy. Specifically, the method 400 results in the identification of components $C_1, C_2, \ldots, C_M$. These components are not the connected subgraphs in the original sense. However, the intersection of these components with the densest subgraphs, or $$C_1 \cap V_l, C_2 \cap V_l, \ldots, C_M \cap V_l \quad (18)$$

are the vertex subsets that generate the connected subgraphs of $D_l = (V_l, E_l)$. It is noted that some of these subgraphs can be empty. Furthermore, some disconnected components at density ranking $\lambda_l$ can become subgraphs within a single connected component at a lower density ranking level.

Figure 5:
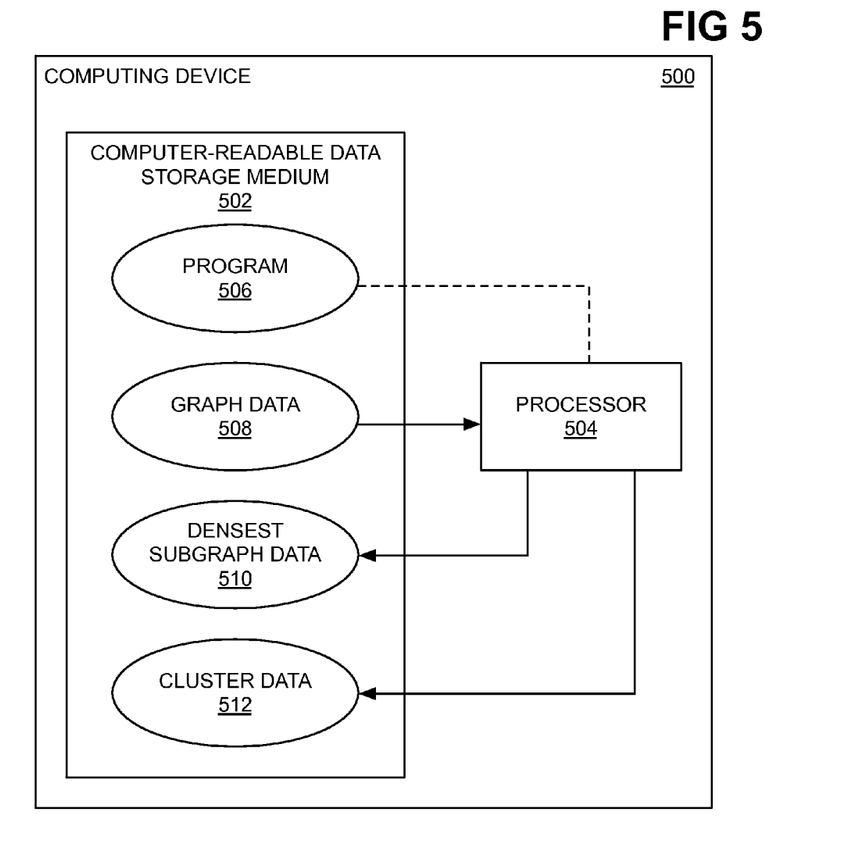
FIG. 5 is a diagram of an example system for clustering vertices of a graph into hierarchical clusters based on subgraph density.

FIG. 5 shows an example computing system that can perform the methods 200, 300, and 400 that have been described. As depicted in FIG. 5, the computing system can be implemented as a computing device 500, such as a desktop or a laptop computer, or another type of computing device. The computing device 500 includes at least a computer-readable data storage medium 502 and a processor 504, and can and typically does include other hardware components, in addition to the medium 502 and the processor 504. The computer-readable data storage medium 502 can be or include volatile semiconductor memory, such as dynamic random access memory (DRAM) in one implementation.

The computer-readable data storage medium 502 stores a computer program 506, graph data 508, densest subgraph data 510, and cluster data 512. The processor 504 executes the computer program 506 from the computer-readable data storage medium 502 to load the graph data 508 into the medium 502. In one implementation where the medium 502 is volatile semiconductor memory, the memory is of sufficiently large capacity to store the entirety of the graph data 508. The graph data 508 represents a graph as has been described above.

The processor 504 executes the computer program 506 to generate the densest subgraph data 510 and then the cluster data 512, which are both stored on the computer-readable data storage medium 502. The densest subgraph data represents the densest subgraphs of the graph represented by the graph data 508. The cluster data 512 represents the clusters at a number of levels of a hierarchy. The processor 504 generates the densest subgraph data 510 from the graph data 508, and generates the cluster data 512 from the graph data 508 and the subgraph data 510. That is, by executing the computer program 506, the processor 504 processes the graph data 508 to yield the densest subgraph data 510, and then processes the graph data 508 and the subgraph data 508 to yield the cluster data 512.

Figure 6:
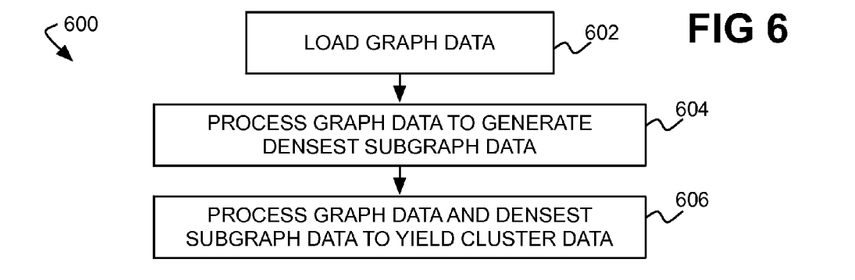
FIG. 6 is a flowchart of an example method that the example system of FIG. 5 can perform and that is consistent with the example method of FIG. 2.

FIG. 6 shows an example method 600 corresponding to the method 200 and that the processor 504 performs by executing the computer program 506. The graph data 508 is loaded into the computer-readable data storage medium 502 (602). The graph data 508 is processed to generate the densest subgraph data 510 (604). Part 604 of the method 600 corresponds to part 202 of the method 200. The graph data 508 and the densest subgraph data 510 are then processed to generate the cluster data 512 (606). Part 606 of the method 600 similarly corresponds to part 204 of the method 200. The methods 300 and 400 that have been described can thus implement parts 604 and 606, respectively, of the method 600, in the same way that they can implement parts 202 and 204 of the method 200.

We claim:

1. A method comprising:
   determining, by a processor, a plurality of densest subgraphs of a graph, the graph including a plurality of vertices and a plurality of edges interconnecting the vertices, each edge connecting two of the vertices and having a weight, the vertices and the edges forming a plurality of subgraphs of the graph from which the densest subgraphs are determined as the subgraphs of the graph having densities greater than a threshold;
   determining, by the processor, a plurality of clusters at a plurality of levels of a hierarchy, based on the densest subgraphs that have been determined, each cluster including a set of the vertices and a set of the edges of the graph, each level corresponding to a different density of the clusters, the hierarchy ordered from a most-dense level of the clusters to a least-dense level of the clusters; and
   outputting, by the processor, the clusters at the levels of the hierarchy that have been determined.

2. The method of claim 1, wherein determining the densest subgraphs of the graphs comprises:
   initializing for each vertex of the graph a vertex variable, and for each edge of the graph a first edge variable and a second edge variable, the first edge variable for a given edge corresponding to a first vertex to which the given edge is connected, the second edge variable for the given edge corresponding to a second vertex to which the given edge is connected;
   processing the edges to update the vertex variables for the vertices and the first edge variables and the second edge variables for the edges;
   ordering the vertices of the graph in a sequence by increasing vertex variable; and
   defining the subgraphs of the graph in a nested manner, where a k-subgraph of the subgraphs includes a first k vertices in the sequence, such a first subgraph having a lesser k than a second subgraph has is more dense than the second subgraph.

3. The method of claim 2, wherein processing the edges comprises:
   inserting the edges of the graph into a queue;
   processing the edges within the queue by, for the given edge:
     where a first condition is true, updating the vertex variable for the first vertex, the vertex variable for the second vertex, and the first edge variable and the second edge variable for the given edge in accordance with a first manner;
     where a second condition different than the first condition is true, updating the vertex variable for the first vertex, the vertex variable for the second vertex, and the first edge variable and the second edge variable for the given edge in accordance with a second manner different than the first manner;
     where neither the first condition nor the second condition is true, removing the given edge from the queue; and
   where the queue is still not empty, reprocessing the edges within the queue.

4. The method of claim 3, wherein processing the edges further comprises, where the queue is now empty:
   processing the edges of the graph by, for the given edge:
     where the first condition is true, updating the vertex variable for the first vertex, the vertex variable for the second vertex, and the first edge variable and the second edge variable for the given edge in accordance with the first manner, and adding the given edge back into the queue;
     where the second condition is true, updating the vertex variable for the first vertex, the vertex variable for the second vertex, and the first edge variable and the second edge variable for the given edge in accordance with the second manner, and adding the given edge back into the queue; and
   where the queue is no longer empty, reprocessing the edges within the queue.

5. The method of claim 3, wherein the first condition is that the vertex variable for the first vertex to which the given edge is connected is greater than the vertex variable for the second vertex to which the given edge is connected and that the first edge variable for the given edge is greater than zero, and wherein the second condition is that the vertex variable for the second vertex to which the given edge is connected is greater than the vertex variable for the first vertex to which the given edge is connected and that the second edge variable for the given edge is greater than zero.

6. The method of claim 3,
wherein the first manner comprises:
determining a modifier as a minimum of the first edge variable and a difference of the vertex variable for the first vertex and the vertex variable for the second vertex divided by two;
updating the vertex variable for the first vertex by subtracting the modifier therefrom, and updating the vertex variable for the second vertex by adding the modifier thereto;
updating the first edge variable by subtracting the modifier therefrom, and updating the second edge variable by adding the modifier thereto,
and wherein the second manner comprises:
determining the modifier as a minimum of the of the second edge variable and a difference of the vertex variable for the second vertex and the vertex variable for the first vertex divided by two;
updating the vertex variable for the second vertex by subtracting the modifier therefrom, and updating the vertex variable for the first vertex by adding the modifier thereto;
updating the second edge variable by subtracting the modifier therefrom, and updating the first edge variable by adding the modifier thereto.

7. The method of claim 1, wherein determining the clusters at the levels of the hierarchy comprises:
indexing the vertices of the graph according to the densities of the subgraphs;
indexing the edges of graph according to the densities of the subgraphs; and
performing a modified breadth-first graph traversal technique to identify the clusters at the levels of the hierarchy, using the vertices and the edges as have been indexed according to the densities of the subgraphs.

8. The method of claim 7, wherein the modified breadth-first graph traversal technique is a breadth-first graph traversal technique that is modified per:
when a current traversal ends due to exhausting the edges of the graph that are permitted to be traversed within the current traversal, a next traversal begins at the vertex of the graph having a smallest index and that has not yet been traversed; and
no traversal traverses between two vertices of the graph that have different indices.

9. The method of claim 7, wherein performing the modified breadth-first graph traversal technique comprises:
setting a current index to a lowest index of the vertices of the graph and setting a current level to a lowest level of the hierarchy; and
breadth-first traversing the vertices of the graph starting at one of the vertices of the graph having the current index without ever traversing to any vertex of the graph having an index different than the current vertex index, until no further vertices of the graph having the current index can be traversed,
wherein the vertices of the graph having the current index that have been traversed and the edges interconnecting the vertices having the current index form the cluster at the current level of the hierarchy.

10. The method of claim 9, wherein performing the modified breadth-first graph traversal technique further comprises, where one or more vertices of the graph have not yet been traversed in any traversal:
setting the current index to a lowest index of the vertices of the graph that have not yet been traversed in any traversal;
advancing the current level to a higher level of the hierarchy; and
re-breadth-first traversing the vertices of the graph.

11. The method of claim 1, wherein one of:
the weight of every edge of the graph is equal to one, such that the edges of the graph are equally weighted;
the weight of each edge of the graph has a value greater than zero, such that the edges of the graph are not equally weighted.

12. The method of claim 1, wherein a density of an entity is defined as a sum of weights of edges encompassed by the entity divided by a number of vertices encompassed by the entity, the entity being one of a subgraph and a cluster.

13. The method of claim 1, wherein determining the densest subgraphs of the graphs comprises:
initializing for each vertex of the graph a vertex variable, and for each edge of the graph a first edge variable and a second edge variable, the first edge variable for a given edge corresponding to a first vertex to which the given edge is connected, the second edge variable for the given edge corresponding to a second vertex to which the given edge is connected.

14. The method of claim 13, wherein determining the densest subgraphs of the graphs further comprises:
processing the edges to update the vertex variables for the vertices and the first edge variables and the second edge variables for the edges.

15. The method of claim 14, wherein determining the densest subgraphs of the graphs further comprises:
ordering the vertices of the graph in a sequence by increasing vertex variable.

16. The method of claim 1, wherein a k-subgraph of the subgraphs includes a first k vertices in a sequence, such that a first subgraph having a lesser k than a second subgraph has is more dense than the second subgraph.

17. A non-transitory computer-readable data storage medium storing a computer program executable by a processor of a computing device to perform a method comprising:
loading, by the processor, into memory of the computing device graph data representing a graph including a plurality of vertices and a plurality of edges interconnecting the vertices, each edge connecting two of the vertices and having a weight, the vertices and the edges forming a plurality of subgraphs of the graph;
processing, by the processor, the graph data from the memory to generate densest subgraph data representing a plurality of densest subgraphs of the graph that are the subgraphs of the graph having densities greater than a threshold;
processing, by the processor, the densest subgraph data and the graph data from the memory to generate cluster data representing a plurality of clusters at a plurality of levels of a hierarchy, each cluster including a set of the vertices and a set of the edges of the graph, each level corresponding to a different density of the clusters, the hierarchy ordered from a most-dense level of the clusters to a least-dense level of the clusters.

18. The non-transitory computer-readable data storage medium of claim 17, wherein processing the graph data to generate the densest subgraph data comprises:

initializing for each vertex of the graph a vertex variable, and for each edge of the graph a first edge variable and a second edge variable, the first edge variable for a given edge corresponding to a first vertex to which the given edge is connected, the second edge variable for the given edge corresponding to a second vertex to which the given edge is connected;

inserting the edges of the graph into a queue;

processing the edges within the queue by, for the given edge:

where a first condition is true, updating the vertex variable for the first vertex, the vertex variable for the second vertex, and the first edge variable and the second edge variable for the given edge in accordance with a first manner;

where a second condition different than the first condition is true, updating the vertex variable for the first vertex, the vertex variable for the second vertex, and the first edge variable and the second edge variable for the given edge in accordance with a second manner different than the first manner;

where neither the first condition nor the second condition is true, removing the given edge from the queue;

where the queue is still not empty, reprocessing the edges within the queue;

where the queue is now empty:

processing the edges of the graph by, for the given edge:

where the first condition is true, updating the vertex variable for the first vertex, the vertex variable for the second vertex, and the first edge variable and the second edge variable for the given edge in accordance with the first manner, and adding the given edge back into the queue;

where the second condition is true, updating the vertex variable for the first vertex, the vertex variable for the second vertex, and the first edge variable and the second edge variable for the given edge in accordance with the second manner, and adding the given edge back into the queue;

where the queue is no longer empty, reprocessing the edges within the queue;

ordering the vertices of the graph in a sequence by increasing vertex variable; and defining the subgraphs of the graph in a nested manner, where a k-subgraph of the subgraphs includes a first k vertices in the sequence, such a first subgraph having a lesser k than a second subgraph has is more dense than the second subgraph.

19. The non-transitory computer-readable data storage medium of claim 17, wherein processing the densest subgraph data and the graph data to generate the cluster data comprises:

indexing the vertices of the graph according to the densities of the subgraphs;

indexing the edges of graph according to the densities of the subgraphs;

setting a current index to a lowest index of the vertices of the graph and setting a current level to a lowest level of the hierarchy;

breadth-first traversing the vertices of the graph starting at one of the vertices of the graph having the current index without ever traversing to any vertex of the graph having an index different than the current vertex index, until no further vertices of the graph having the current index can be traversed;

where one or more vertices of the graph have not yet been traversed in any traversal:

setting the current index to a lowest index of the vertices of the graph that have not yet been traversed in any traversal;

advancing the current level to a higher level of the hierarchy; and re-breadth-first traversing the vertices of the graph, wherein the vertices of the graph having the current index that have been traversed and the edges interconnecting the vertices having the current index form the cluster at the current level of the hierarchy.

20. A computing system comprising:

a computer-readable data storage medium to store:

a computer program;

graph data representing a graph including a plurality of vertices and a plurality of edges interconnecting the vertices, each edge connecting two of the vertices and having a weight, the vertices and the edges forming a plurality of subgraphs of the graph;

densest subgraph data representing a plurality of densest subgraphs of the graph that are the subgraphs of the graph having densities greater than a threshold;

cluster data representing a plurality of clusters at a plurality of levels of a hierarchy, each cluster including a set of the vertices and a set of the edges of the graph, each level corresponding to a different density of the clusters, the hierarchy ordered from a most-dense level of the clusters to a least-dense level of the clusters; and a processor to execute the computer program from the computer-readable medium to process the graph data to yield the densest subgraph data and to process the densest subgraph data and the graph data to yield the cluster data.

* * * * *

UNITED STATES PATENT AND TRADEMARK OFFICE
CERTIFICATE OF CORRECTION

PATENT NO. : 8,971,665 B2
APPLICATION NO. : 13/562598
DATED : March 3, 2015
INVENTOR(S) : Bin Zhang et al.

It is certified that error appears in the above-identified patent and that said Letters Patent is hereby corrected as shown below:

In the Drawings

In sheet 2 of 4, reference numeral 308, line 1, delete "PROCES" and insert -- PROCESS --, therefor.

In the Claims

In column 9, line 22, in Claim 6, delete "of the of the" and insert -- of the --, therefor.

Signed and Sealed this
Eighth Day of September, 2015

Michelle K. Lee
*Director of the United States Patent and Trademark Office*